Dec. 23, 1969    T. F. BROLUND    3,485,131
MACHINE FOR OPERATING ON SHEET MATERIAL
Filed Aug. 11, 1966    2 Sheets-Sheet 2
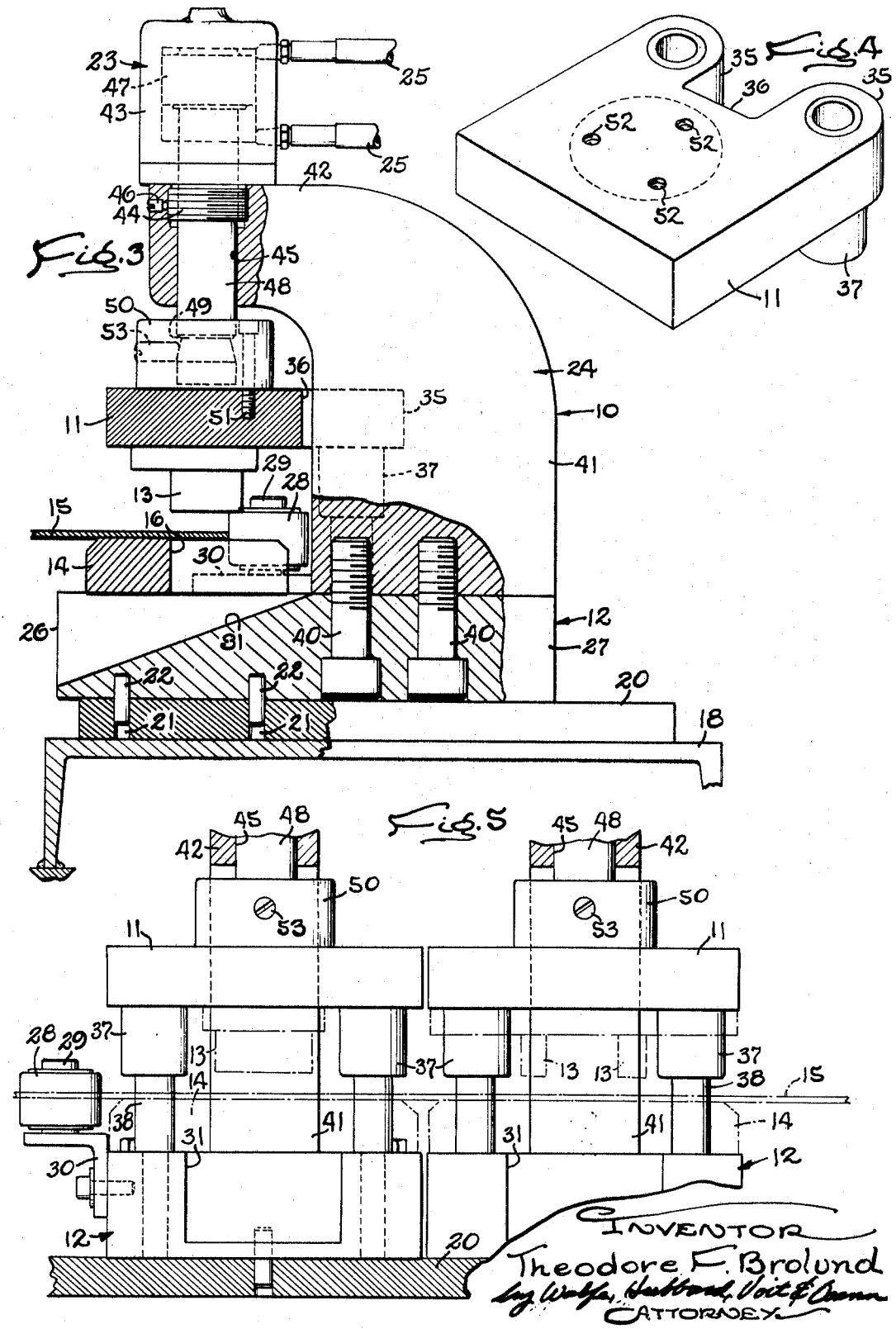
INVENTOR
Theodore F. Brolund
ATTORNEY

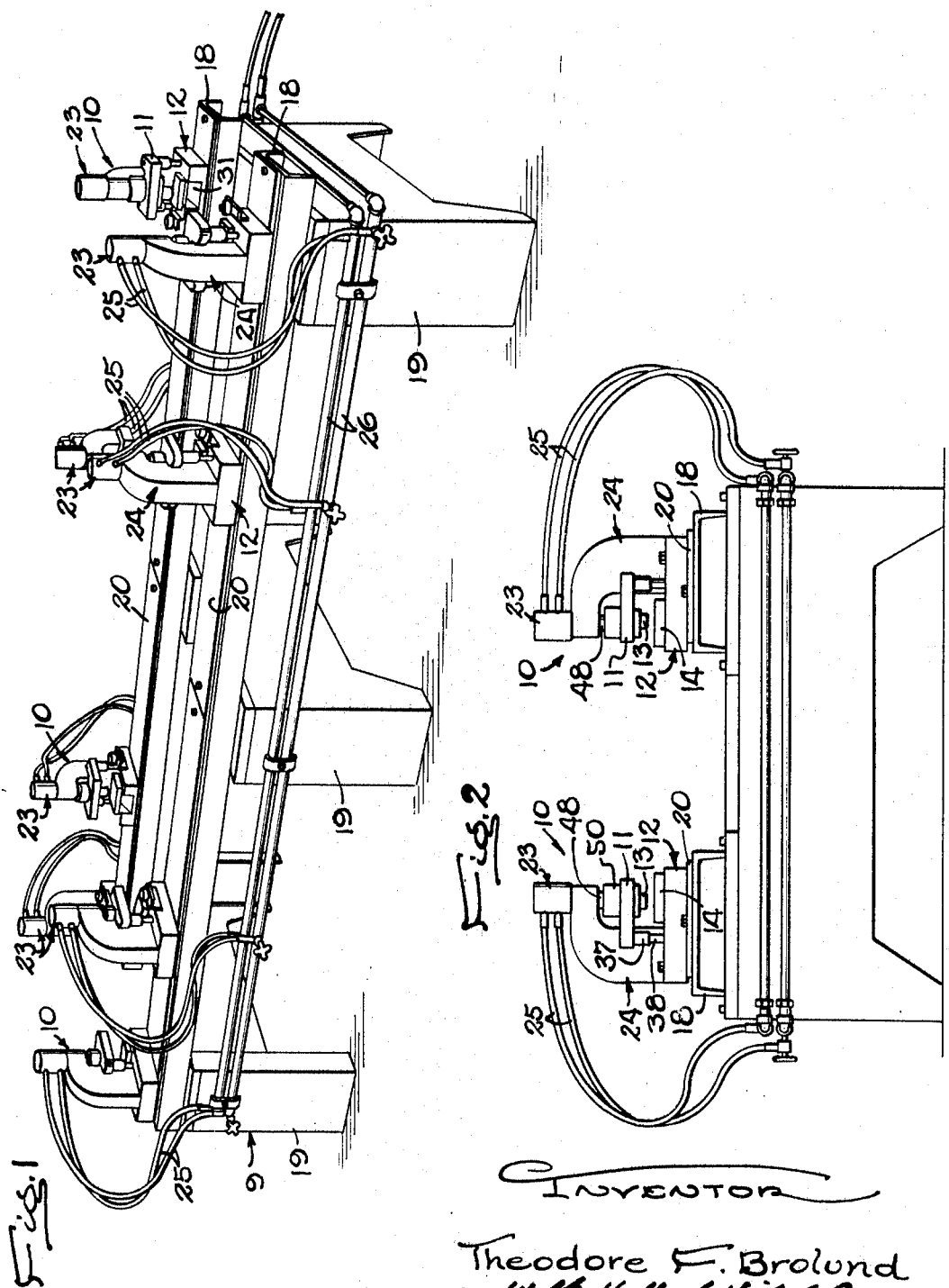

United States Patent Office

3,485,131
Patented Dec. 23, 1969

3,485,131
MACHINE FOR OPERATING ON SHEET MATERIAL
Theodore F. Brolund, Rockford, Ill., assignor to W. A. Whitney Manufacturing Company, Rockford, Ill., a corporation of Illinois
Filed Aug. 11, 1966, Ser. No. 571,909
Int. Cl. B26d 5/12, 11/00
U.S. Cl. 83—560          6 Claims

ABSTRACT OF THE DISCLOSURE

A machine with a gang of perforating units for piercing sheet material comprises a supporting bed with an accurately machine template for precisely locating the perforating units relative to one another and the material. Each perforating unit includes a die set constructed as a self-supporting package and having a die holder mounting a reciprocating tool holder. The die holder is located on the template with its lower surface directly in contact with the template to reduce positioning errors, and bodily supports a driving assembly which reciprocates the tool holder and which may be detached quickly from the die holder and used interchangeably with other die sets.

---

This invention relates to a machine for performing operations on workpieces and, more particularly, to a machine of the type including a gang of perforating units each having a reciprocating tool holder guided for movement toward and away from a die holder and carrying a tool element cooperating with a complementary die element supported on the die holder to notch or pierce a sheet of material disposed between the two elements. The die, the tool, and their respective holders constitute the components of a so-called die set and are permanently matched with each other and usually with a supporting or driving assembly to maintain the elements accurately alined for forming perforations of precise sizes and shapes. Since dies and tools of different types, sizes and shapes are used for performing different operations, changeover from one operation to another with prior machines that have found commercial acceptance has caused a significant amount of "down" time and has resulted in a considerable number of machine parts being idle during the performance of other operations.

The general object of the present invention is to provide a new and improved perforating unit which is more precise, compact and economical and, at the same time, has much greater versatility than prior constructions used for related purposes.

A further object is to construct the die sets as unitary, self-supported packages quickly interchangeable for use with a universal driving assembly thereby reducing the number of driving assemblies required for performing different operations.

Another object is to use the die set itself for supporting the driving assembly to reduce positioning errors and to eliminate separate and bulky supporting structures.

A further object is to mount the die holder directly in contact with a locating template on a supporting bed to reduce errors in alinement and to facilitate rapid changeover.

The invention also resides in the novel construction and mounting of the tool holder.

Other objects and advantages of the invention will become apparent from the following detailed description taken in connection with the accompanying drawings, in which FIGURE 1 is a perspective view of a machine having a gang of perforating units embodying the novel features of the present invention.

FIG. 2 is a side elevation of the machine shown in FIG. 1.

FIG. 3 is an enlarged fragmentary side elevation of a single unit with parts broken away and shown in section.

FIG. 4 is a perspective view of the tool holder.

FIG. 5 is a fragmentary front elevation showing a pair of units operating on a workpiece.

As shown in the drawings for purposes of illustration, the invention is embodied in a machine comprising a supporting bed 9 on which is mounted a gang of perforating units 10 each having a reciprocating tool holder 11 guided for movement toward and away from a die holder 12 and carrying a tool element 13 coacting with a die element 14 supported on the die holder to perform a machining operation on a workpiece 15 (FIGS. 3 and 5) such as a piece of sheet metal disposed between the elements. Machines of this type are used by various manufacturers for shearing, blanking, piercing, and notching metal sheets which eventually are fabricated into finished products, the particular operation performed depending on the type of tools and dies employed in the perforating units. In the units illustrated, the tools are punches which cooperate with complementary cavities 16 (FIG. 3) in the dies to form V-shaped notches in the edge portions of the sheet.

To punch a series of notches simultaneously along each edge portion of the sheet 15, the punching units 10 are arranged on the supporting bed 9 in a pair oppositely facing rows and are spaced from each other along the rows in accordance with the desired spacing of the notches to be formed. The sheet first is placed between the rows of units with its edge portions overlying the dies 14, and the punches 13 then are reciprocated in unison to notch both edge portions of the sheet simultaneously.

More specifically, the bed 9 includes a pair of elongated inverted channels 18 extending parallel to each other and supported on three upright standards 19 disposed beneath the channels. On the upper surface of each channel is positioned an accurately machined removable template 20 formed with a series of upwardly opening pilot holes 21 (FIG. 3) slidably receiving locator pins 22 secured to and depending from the bottoms of the punching units 10. By correlating the positions of the pilot holes with the positions of the notches to be formed in the sheet 15, the units may be mounted on the bed in precise relationship with the sheet to insure that the notches are punched in the correct locations.

As shown in FIGS. 1 and 2, the punches herein are reciprocated by individual driving assemblies including fluid-operated actuators 23 mounted on supports 24 and receiving pressure fluid through flexible lines 25 communicating with a manifold 26. The latter extends around the bed 9 and is supplied with fluid by a suitable pressure source (not shown).

In designing a punching unit 10 capable of performing precision operations and holding close tolerances, the punch 13, the die 14 and their respective holders 11 and 12 initially are carefully matched with each other to form a so-called die set, and thereafter each element is used only with the other elements of the set. In addition, it has been the practice in the past to mount a particular type and size of die set in a particular type and size of supporting assembly and often to match the die set with the supporting assembly to insure that the punch and the die will be maintained parallel to and alined with each other to produce accurate machining. As a consequence, a number of separate units with different types of tooling and supports have been required to perform different operations thus requiring a large capital investment, necessitating time-consuming changeovers, and resulting in many complete units being idle while others are operating.

In accordance with one aspect of the present invention, each die set including the punch 13, the die 14, and their holders 11 and 12 is constructed as a self-supporting, unitary package which supports the driving assembly including the actuator 23 and the support 24 and which may be quickly removed from the driving assembly and replaced with another die set for performing a different operation. To these ends, the support 24 carrying the actuator is mounted directly on the die holder itself and is removably fastened thereto, while the punch holder is permanently mounted for reciprocation directly on the die holder and herein is detachably connected to the actuator. Accordingly, the die set not only supports itself and the driving assembly thus eliminating additional bulky supporting structure and underlying supports beneath the die holder, but it also is removable from the driving assembly as a unit and replaceable with a die set of a different size or shape thereby substantially reducing the number of driving assemblies required for performing a series of different operations.

In the present instance, the die holder 12 is a relatively thick rectangular block of steel having flat upper and lower surfaces and formed with a forward portion 26 (FIG. 3) and a portion 27 integral with and extending rearwardly from the forward portion. The die 14 is permanently mounted and precisely positioned on the upper surface if the forward portion by means of screws and leader pins (not shown) projecting downwardly from the lower surface of the die into holes formed in the holder. As shown most clearly in FIGS. 3 and 5, a small roller 28 journaled for rotation on a vertical pin 29 is disposed adjacent one side of the die and is fastened to one side of the holder by an angle bracket 30. The roller engages and guides one edge of the sheet 15 to maintain the latter laterally alined with the punch 13 and the die during the punching operation. To permit the metal slugs notched from the sheet to escape from the die cavity 16, a downwardly and forwardly inclined slug chute 31 (FIG. 3) is formed through the forward portion of the holder. The upper end of the chute is alined with the die cavity while the lower end opens to the front side of the holder thereby allowing the slugs to slide downwardly from the die and out of the holder. The size and shape of the chute is governed to a large extent by the size and shape of the particular die with which the holder is matched.

Advantageously, the lower surface of the die holder 12 is supported on and disposed in direct face-to-face contact with the template 20 and is formed with downwardly opening holes into which the locating pins 22 are permanently secured. By thus mounting the die holder directly on the template, the number of parts necessary to aline between the die 14 and the template is minimized thus resulting in fast and easy installation and precision positioning of the unit. In addition, the distance from the top of the template to the top of the die is kept comparatively small to minimize the effect of one unit 10 being slightly tilted relative to the adjacent units due to slight irregularities of the die holder or foreign matter on the template.

Herein, the punch holder 11 is a substantially rectangular plate having a centrally disposed vertical bore (not shown) receiving the punch 13. At its rear side, the punch holder is formed with a pair of horizontally spaced and rearwardly projecting ears 35 defining between them an upwardly, downwardly and rearwardly opening recess 36. Depending from each of the ears is a tubular sleeve 37 slidably telescoped over one of a pair of alined upright guide pins 38 upstanding from the rearwardly extending portion 27 of the die holder 12. The pins and the sleeves are machined to extremely close tolerances and are accurately located relative to the respective holders so that the punch is maintained directly in line with the die 14 as the punch holder is reciprocated. Because the punch holder is mounted directly on the die holder and the latter, in turn, is supported directly on the template 20, the holders, the punch and the die constitute a die set which is a compact, self-supporting package movable as a unit for rapid changeover between operations.

As shown most clearly in FIG. 3, the die holder 12 not only supports the punch holder 11 but also mounts the support 24 for the fluid actuator 23. For this purpose, the support is formed with a flat lower surface disposed on the upper surface of the rearwardly extending portion 27 of the die holder and is detachably fastened to the latter by a pair of cap screws 40 (FIG. 3) extending upwardly through the die holder and threaded into the bottom of the support. With the support positioned on a surface of the die holder other than the lower surface, the latter is unobstructed by the support and may be placed directly against the template 20 without any intermediate supporting member between the die holder and the template to introduce alinement errors. Preferably, the support includes a vertically extending portion 41 disposed within the recess 36 between the ears 35 of the punch holder, and an upper end portion 42 projecting forwardly from the vertical portion and overhanging the punch holder.

In this instance, the fluid-operated actuator 23 is a double-acting hydraulic ram having a cylinder 43 communicating with the lines 25 and mounted in an upright position on top of the overhanging portion 42 of the support 24. At its lower end, the cylinder is formed with a downwardly projecting sleeve 44 (FIG. 3) threaded into a bore 45 formed through the overhanging portion and held securely therein by a set screw 46. A piston 47 is guided for reciprocation in the cylinder in response to the admission of pressure fluid into the cylinder alternately on opposite sides of the piston and carries an elongated piston rod 48 which extends downwardly through the sleeve and the bore and is formed with an annular groove 49 near its free end. To fasten the rod to the punch holder 11, an adapter in the form of a collar 50 is telescoped over the free end of the rod and is anchored to the punch holder by cap screws 51 (FIG. 3) threaded into three angularly spaced holes 52 (FIG. 4) formed in the top of the punch holder. A set screw 53 extending radially through the collar seats within the groove in the piston rod and fastens the holder securely but removably to the rod. It thus is apparent that the driving assembly including the support 24 and the actuator 23 may be removed from the die set as a unit simply by loosening the set screw 53 and removing the two screws 40 at the bottom of the support.

During operation of the punching unit 10, the vertically extending portion 41 of the support 24 bears against the die holder 12 and serves as a thrust-receiving member to absorb the reactionary force produced by the reciprocation of the punch 13 and the punch holder 11. In addition, the support is disposed within the recess 36 with its front side disposed closely adjacent the rear side of the recess and thus the overhanging portion 42 may be made relatively short to minimize bending and deflection of the support as the punch strikes the sheet 15.

From the foregoing, it will be seen that the complete changeover from one die set to another is a rapid and simple operation requiring, at most, a few minutes time. The operator simply lifts the unit 10 from template 20, loosens the set screw 53, and removes the cap screws 40 to separate the die set from the driving assembly. The driving asembly then is attached to a die set of a different type and the assembled machine is installed on the template. By constructing the die sets and the driving assemblies as separate packages, the number of driving assemblies required for performing different operations is substantially reduced thus resulting in low capital investment. Moreover, errors resulting from misalinement are minimized because the die holder is supported directly on template without the intermediary of a separate supporting member.

I claim as my invention:

1. In combination with a tool, a die, and a locating template having a plurality of upwardly opening pilot holes in its upper surface, the improvement comprising, a mechanism for operating on sheet material having
    (A) a die set including
        (1) a die holder adapted to be supported in a horizontal position on the template and having
            (a) a forward portion for supporting the die,
            (b) a portion extending rearwardly from said forward portion, and
            (c) a plurality of downwardly opening holes in its lower surface vertically alined with the pilot holes in the template and receiving upright locator pins adapted to fit in the pilot holes to establish a precise positional relationship between the die holder and the template,
        (2) a tool holder spaced above said die holder and having
            (a) a forward portion overlying said forward portion of said die holder for supporting the tool in vertical alinement with the die, and
            (b) a pair of horizontally spaced projections extending rearwardly from said forward portion and defining between them an upwardly, downwardly and rearwardly opening recess, and
        (3) means mounting said tool holder on said die holder and guiding the tool holder for reciprocation toward and away from the die holder comprising
            (a) a guide member depending from each of said projections, and
            (b) complementary upright guide members upstanding from said rearwardly extending portion of said die holder and telescoped with said depending members with a precise sliding fit, and
    (B) a driver assembly for said die set having
        (1) a support extending upwardly from said rearwardly extending portion of said die holder and fitting within said recess between said projections and having an upper end portion overhanging said tool holder,
        (2) a fluid-operated actuator mounted on said overhanging portion for reciprocation toward and away from said die holder,
        (3) means detachably fastening said actuator to said tool holder to reciprocate the latter with the actuator, and
        (4) means detachably anchoring said support to said rearwardly extending portion of said die holder whereby said die set supports said driver assembly and is removable and replaceable as a unit.

2. In a machine for perforating a sheet of material, the combination of, a bed, an accurately machined locating template removably supported on said bed and having a plurality of upwardly opening pilot holes in its upper surface; a die set including a die holder having a lower surface disposed in direct face-to-face contact with the upper surface of said template and having a series of depending locating pins alined with and fitting within said pilot holes to establish a precise positional relationship between the die and the template, said die holder having a forward portion underlying the material and having a portion extending rearwardly from said forward portion and beyond the edge of the material, a perforating die supported on the upper surface of said forward portion and beneath the material, a punch holder spaced above said die holder and overlying said die, a perforating punch fastened securely to said punch holder and alined with said die, guides extending between said rearwardly extending portion and said punch holder and mounting the latter for reciprocation toward and away from said die; a driving assembly including a support extending upwardly from said rearwardly extending portion of said die holder and having an upper end portion overhanding said punch holder, a driver mounted on said overhanging portion and detachably connected to said punch holder to reciprocate the latter and said punch toward and away from said die to perforate the material, and means detachably fastening said support to said rearwardly extending portion of said die holder whereby said die set supports said driver assembly and is removable and replaceable as a unit.

3. In a mechanism for operating on sheet material, the combination of,
    (A) a die set comprising
        (1) a die holder adapted to be supported in a horizontal position and having
            (a) a forward portion for supporting a die and
            (b) a portion extending rearwardly of said forward portion,
        (2) a tool holder for supporting a tool spaced above said die holder and overlying said forward portion, said tool holder comprising a horizontally disposed plate having a pair of horizontally spaced and rearwardly extending projections defining between them an upwardly, downwardly and rearwardly opening recess, and
        (3) means mounting said tool holder on said die holder and guiding the tool holder for reciprocation toward and away from the upper surface of said die holder, said means comprising
            (a) upright members upstanding from said die holder and
            (b) complementary members on said projections and slidable upwardly and downwardly on said upright members, and
    (B) a driver assembly for said die set having
        (1) a support extending upwardly from said rearwardly extending portion and between said projections with its forward side disposed adjacent the rearwardly facing side of said recess, said support having an upper end portion projecting forwardly to overhang said tool holder,
        (2) a fluid-operated actuator mounted on said overhanging portion for reciprocation toward and away from said die holder,
        (3) means detachably fastening said actuator to said tool holder to reciprocate the latter with the actuator, and
        (4) means detachably anchoring said support to said rearwardly extending portion of said die holder with the support positioned on a surface of said die holder other than the lower surface of the die holder whereby said lower surface is unobstructed and whereby said die set supports said driver assembly and is removable and replaceable as a unit.

4. A mechanism as defined in claim 3 in which said die holder has a plurality of locator pins depending from its lower surface.

5. A mechanism as defined in claim 3 in which said upright members are pins and said complementary members are sleeves slidably telescoped over said pins.

6. A mechanism as defined in claim 3 in which said guide means include two sleeves depending from the projections on said tool holder and slidably telescoped over two pins upstanding from said die holder.

(References on following page)

References Cited

UNITED STATES PATENTS

| | | | |
|---|---|---|---|
| 1,311,540 | 7/1919 | Thomas | 83—637 |
| 2,269,914 | 1/1942 | Parker | 83—639 |
| 2,323,431 | 7/1943 | Wales | 83—560 X |
| 2,381,062 | 8/1945 | Kirsch | 83—637 |
| 3,198,052 | 8/1965 | Persson | 83—560 X |
| 3,283,634 | 11/1966 | Lodjic | 83—444 X |
| 486,906 | 11/1892 | Stenwall | 83—619 X |
| 3,196,728 | 7/1965 | Snow | 83—698 X |

JAMES M. MEISTER, Primary Examiner

U.S. Cl. X.R.

83—516, 637, 639, 698